United States Patent [19]
Leblond

[11] 3,776,509
[45] Dec. 4, 1973

[54] VALVE HAVING AN ECCENTRIC BUTTERFLY MEMBER AND SEALING ELEMENT FOR SAID VALVE
[75] Inventor: Christian Leblond, Atton, France
[73] Assignee: Pont-A-Mousson S.A., Pont-A-Mousson, France
[22] Filed: Feb. 27, 1973
[21] Appl. No.: 336,294

[30] Foreign Application Priority Data
Mar. 22, 1972 France .............................. 7209970

[52] U.S. Cl. .............................................. 251/306
[51] Int. Cl. ............................................ F16k 1/226
[58] Field of Search ............................. 251/305–308

[56] References Cited
UNITED STATES PATENTS
3,473,784  10/1969  Radford ............................. 251/306

Primary Examiner—Henry T. Klinksiek
Attorney—Richard C. Sughrue et al.

[57] ABSTRACT

A valve of the type having an axial bore and an annular radial bearing surface and two radially extending bearings in the body for receiving two journals carrying a butterfly member which is eccentric relative to the journals. A sealing element is disposed in the bore and has a cylindrical sleeve portion and, at one end, an outer radial bearing surface for bearing against the valve body and a beading which extends radially inwardly against which the butterfly member bears in the closing position and, in the middle of the sealing element, two diametrally opposed coaxial passageways for the journals. The distance between the axis of the passageways and the bearing surface of the sealing element in the free state of the sealing element exceeds the distance between the axis of the bearings and the bearing surface of the valve body and the diameter of the passageways of the sealing element in the free state of the sealing element is less than the diameter of the journals.

4 Claims, 4 Drawing Figures

VALVE HAVING AN ECCENTRIC BUTTERFLY MEMBER AND SEALING ELEMENT FOR SAID VALVE

The present invention relates to a valve having an eccentric butterfly member of the type comprising a valve body having an axial bore and a radial annular bearing surface, a butterfly member which is carried by journals received in radial bearings associated with the valve body and is eccentric with respect to said journals, and a sealing element having a cylindrical sleeve portion and disposed in the bore of the valve body and having, at one end, an outer radial annular surface for bearing against the valve body and a radially inwardly projecting beading against which beading the butterfly member bears in the closing position, and, in the midpart of the sealing element, two diametrically opposed passageways for the passage of the journals.

Valves of this type are already known, for example from the French Patent Application filed by the Applicant under No. 71,31 290, but the distance between the axis of the bearings and the bearing surface of the valve body is equal to the distance between the axis of the passageways in the sealing element and its bearing surface in the free state, and the diameter of these passageways, with the sealing element in the free state, is equal to that of the journal.

Now, a seal between the journals and the bearings is difficult to achieve, in particular when the difference between the fluid pressures of the fluid in the valve on each side of the butterfly member, when the latter is in the closing position, is excessive, the higher of said pressures tending to shift the butterfly member and its journals away from the elastic sealing rings usually mounted in the bearings. The contact between the passageways of the sealing element and the journals must be fluidtight even in the presence of this pressure difference.

This seal is suitable when the valve is mounted between pipe flanges the diameter of which is equal to the nominal diameter of the valve for which the latter has been constructed, namely the inside diameter of the sealing element. On the other hand, this is no longer so when the flange mounted adjacent the beading of the sealing element, which is usually the downstream flange with respect to the direction of flow of the fluid, has a larger diameter, since under the effect of an excessive pressure difference, the beading flows in the downstream direction and the walls of the passageways come away from the journals and thus result in leakages.

An object of the present invention is to avoid this drawback.

The invention provides a valve of the above-defined type, wherein the distance between the axis of the passageways and the bearing surface of the sealing element in the free state exceeds the distance between the axis of the bearings and the bearing surface of the valve body and the diameter of the passageways of the sealing element in the free state is less than the diameter of the journals.

Thus, even when the sealing element is distorted in the downstream direction, the thickness of the rubber applied against the downstream side of the journals is still enough to ensure a seal between these journals and their bearings.

Another object of the invention is to provide a sealing element for the valve having the same features as those mentioned hereinbefore as concerns the distances and the diameters.

Further features and advantages of the invention will be apparent from the ensuing description with reference to the accompanying drawing.

Figures 2, 3, 4:
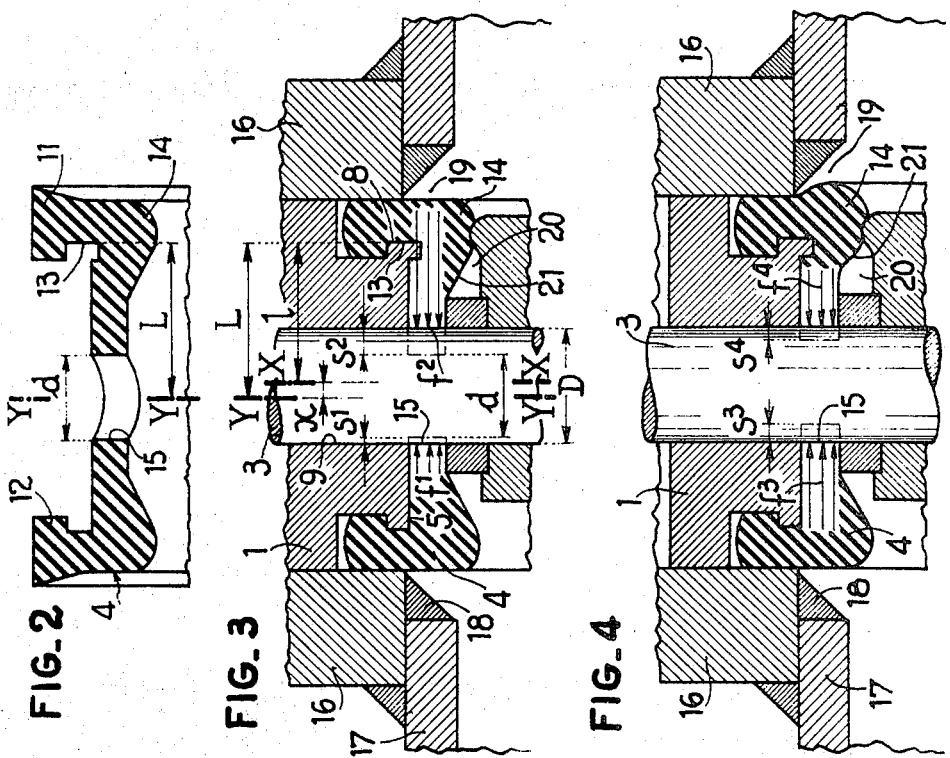
FIG. 2 is a partial diametral sectional view of the sealing element of the valve shown in the free state.
FIG. 3 is a partial diametral sectional view to an enlarged scale of the valve shown in FIG. 1 when the valve is closed but not in service.
FIG. 4 is a view similar to FIG. 3 when the valve is closed and in service.
Figure 1:
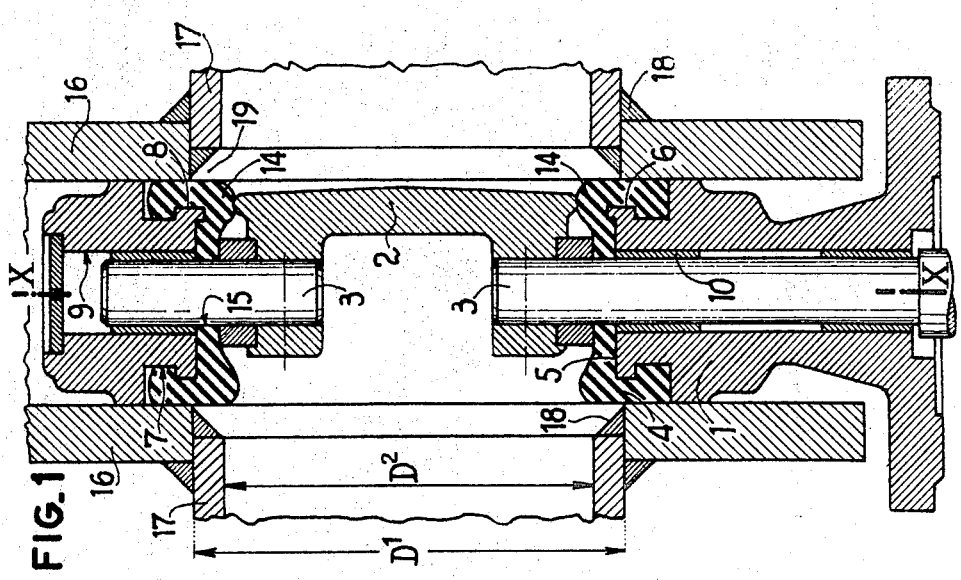
FIG. 1 is a diametral sectional view through the axes of the journals of a valve having an eccentric butterfly member according to the invention mounted between two flanges.

The valve shown in the drawing is of the type described and shown in the aforementioned Patent Application and comprises a valve body 1, a butterfly member 2 carried by journals 3 and a rubber sealing element 4 disposed in the valve body. The valve body 1 has for this purpose an axial bore 5 and, at both ends of the latter, annular cavities 6 having at their radially outermost part a recessed or re-entrant portion 7, the radial annular surfaces 8 of the cavities located outside the recessed portion 7 constituting bearing surfaces for the sealing element. The contact area of the bearing surface 8 is extended by an inwardly projecting annular radial lip. The journals 3 are received in radial bearings 9 of the valve body which have an axis X—X, with interposition of elastically yieldable sealing sleeves 10 and the butterfly member 2 is eccentric with respect to these journals. The sealing element 4 comprises a cylindrical sleeve portion and at each axial end of the element, an annular outer radial flange 11 having at its end an inner axial flange 12 which defines an annular radial bearing surface 13 and an annular inner radial beading 14 so that the section of the sealing element has roughly the shape of an H. The flanges 11 are engaged in the cavities 6 of the valve body and the flanges 12 in the recessed portions 7 of the cavities with in particular a mutual bearing contact between the surfaces 8 and 13 which hooks the sealing element to the body. The sealing element has in its middle two diametrally opposed passageways 15 through which the journals 3 extend.

As shown in FIG. 2, the passageways in the sealing element 4 have, when the latter is in the free state, an axis Y—Y and a diameter $d$ and, as shown in FIG. 3, in which the contour in the free state of the sealing element is shown in dot-dash line, the diameter $d$ of the passageways of the sealing element in the free state is less than the diameter D of the journals and the distance L between the axis Y—Y of the passageways and the bearing surface 13 of the sealing element in the free state, located adjacent the beading 14 against which the butterfly member bears in the closing position, that is to say, on the downstream side with respect to the direction of flow of the fluid (the butterfly member being usually disposed on this side in the closing position), is greater than the distance $l$ between the axis X—X of the bearings and the bearing surface 8 of the valve body which is located on the same side.

In the particular embodiment described, the valve body is substantially symmetrical with respect to a diametral plane through the axis X—X of the bearings and the sealing element is on the whole also substantially symmetrical with respect to this plane, although the axis Y—Y of the passageways of the sealing element are offset a distance $x$ in the upstream direction with respect to this plane of symmetry.

The absolute symmetry of the valve body and the sealing element is slightly disturbed by the extended lip on the bearing surface 8 and the corresponding annular pocket formed adjacent the bearing surface 13 to accommodate the lip.

The valve is mounted between two flanges 16 which are fixed to the ends of the two pipes 17 which extend half-way into the flanges, the latter being connected to the pipes by a mechanical welding along weld beads 18, the inner bead of which has a flank or side at 45°. The pipe 17 has a nominal diameter $D^2$ for which the valve has been constructed but as the flanges 16 have an inside diameter $D^1$ exceeding the diameter $D^2$ there exists between the weld beads 18 and the end faces of the flanges 11 of the sealing element an empty annular space 19.

Thus, the downstream beading 14 can flow towards the space 19 when the pressure prevailing upstream of the sealing element urges the beading in the downstream direction. In this deformation of the sealing element, the downstream portion of the wall of the passageways 15 could, if the preceding relations between $d$ and $D$, on one hand, the $l$ and $L$, on the other hand, were not provided, be shifted away from the journals to an extent to allow a leakage of fluid. Indeed, the downstream beading 14 is subjected to an appreciable force due to the pressure prevailing in the empty annular space 20 between the outer contour of the butterfly member and the downstream inner profile 21 of the beading 14.

However, the passageway diameter $d$ in the free state of the sealing element is less than the diameter D of the journals and, upon assembly, there is consequently a tight contact $S^1$ on the upstream side and a tight contact $S^2$ on the downstream side, namely a diametral tight fit $S^1 + S^2$ between the sealing element and the journals. Further, as the axis Y—Y of the passageway in the free state is offset a distance $x = L - l$ with respect to the axis X—X of the journals in the upstream direction, that is to say toward the side where usually the highest pressure is exerted when the valve is closed, the downstream tight contact force $S^2$ is greater than the upstream tight contact force $S^1$.

As shown in FIG. 3, when this greater pressure is exerted on the downstream beading 14 there is produced in the direction of the annular space 19 a flow of the sealing element accompanied by a hollowing of the upstream inner profile 21 of the beading and a downstream displacement of the region of the sealing element which surrounds the downstream part of the wall of the passageways, this displacement increasing the upstream tightness and decreasing the downstream tightness.

The values of the tight contacts are materialized in FIGS. 3 and 4 by the length of the arrows $f^1$ and $f^2$ in respect of FIG. 3 and $f^3$ and $f^4$ in respect of FIG. 4, which are applied to the upstream and downstream parts of the walls of the passageways. The deviations $S^1$ and $S^2$ of FIG. 3 between the positions in the free state and in the mounted state of said upstream and downstream parts correspond to the arrows $f^1$ and $f^2$ and, by analogy, solely to show the evolution of the tight fits when the valve is in service, theoretical deviations $S^3$ and $S^4$ are shown in FIG. 4.

The difference $D - d$ of the diameters and the offset $x$ in the upstream direction are such that the downstream tight fit under the highest pressure to which the valve may be exposed remains sufficient to preclude any separation between the downstream part of the wall of the passageways and the journals which would result in leakage.

Having now described my invention what I claim as new and desire to secure by Letters Patent is :

1. In a valve comprising a valve body defining an axial bore and an annular radial bearing surface, two radially extending coaxial bearings in the valve body, an eccentric butterfly member, two journals received in the bearings of the valve body and carrying the butterfly member, the butterfly member being eccentric with respect to said journals, and a sealing element comprising a cylindrical sleeve portion which is disposed in the bore of the valve body and has at one end an outer annular radial bearing surface for bearing against the annular radial bearing surface of the valve body and a beading which extends radially inwardly of said bearing surface, against which beading the butterfly member is adapted to bear in the valve closing position and, in the middle part of the sealing element, two diametrally opposed coaxial passageways for the passage of the journals; the improvement characterized by the distance between the axis of the passageways and the bearing surface of the sealing element in the free state of the sealing element exceeding the distance between the axis of the bearings and the bearing surface of the valve body, and the diameter of the passageways of the sealing element in the free state of the sealing element being less than the diameter of the journals.

2. A valve as claimed in claim 1, having a valve body which is symmetrical with respect to a plane perpendicular to said axial bore and has a sealing element which is substantially symmetrical with respect to a plane perpendicular to said axial bore, the axis of the passageways of the sealing element in the free state of the sealing element being offset in the axial direction with respect to its plane of symmetry.

3. In a sealing element for a valve comprising a valve body defining an axial bore and an annular radial bearing surface, two radially extending coaxial bearings in the valve body, an eccentric butterfly member, two journals received in the bearings of the valve body and carrying the butterfly member, the butterfly member being eccentric with respect to said journals, said sealing element comprising a cylindrical sleeve portion having an axis and for disposing in the bore of the valve body coaxially with said bore and at one end an outer annular radial bearing surface for bearing against the valve body and a radially inwardly projecting beading against which beading the butterfly member is adapted to bear in the closed position of the valve, and, in the middle part of the sealing element, two diametrally opposed passageways for the passage of the journals : the feature that the distance between the axis of the passageways and the bearing surface of the sealing element in the free state of the sealing element exceeds the distance between the axis of the bearings and the bearing surface of the valve body and the diameter of the passageways of the sealing element in the free state of the sealing element is less than the diameter of the journals.

4. A sealing element as claimed in claim 3, for a valve having a valve body which is symmetrical with respect to a plane perpendicular to the axial bore, the sealing element being substantially symmetrical with respect to a plane perpendicular to the axis of the sealing element, wherein in the free state of the sealing element the axis of the passageways is offset in the axial direction with respect to the plane of symmetry of the sealing element.

* * * * *